United States Patent
Chen et al.

(10) Patent No.: US 9,761,092 B2
(45) Date of Patent: Sep. 12, 2017

(54) DOORBELL SYSTEM AND DOORBELL CONTROL DEVICE

(71) Applicant: Sercomm Corporation, Taipei (TW)

(72) Inventors: Chien-Ming Chen, Taipei (TW); Meng-Chien Chiang, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 15/372,436

(22) Filed: Dec. 8, 2016

(65) Prior Publication Data

US 2017/0221318 A1    Aug. 3, 2017

(30) Foreign Application Priority Data

Feb. 1, 2016   (CN) ............... 2016 2 0100706 U
Feb. 5, 2016   (CN) ............... 2016 2 0117281 U

(51) Int. Cl.
*G08B 3/00*   (2006.01)
*G08B 3/10*   (2006.01)
*H01H 13/52*   (2006.01)

(52) U.S. Cl.
CPC ............. *G08B 3/10* (2013.01); *H01H 13/52* (2013.01)

(58) Field of Classification Search
CPC . G08B 3/10; G08B 17/00; H01H 9/08; H08H 13/023
USPC ........ 340/328, 326, 332, 692, 506, 511, 521
See application file for complete search history.

(56) References Cited

U.S. PATENT DOCUMENTS

| | | |
|---|---|---|
| 5,905,787 A | 5/1999 | Stuart |
| 6,185,294 B1 | 2/2001 | Chornenky et al. |
| 6,414,589 B1 | 7/2002 | Angott et al. |
| 7,319,402 B1 * | 1/2008 | Sudderth ............... G08B 3/10 340/332 |
| 7,336,158 B2 | 2/2008 | Lombardo |
| 8,780,201 B1 | 7/2014 | Scalisi et al. |
| 8,823,795 B1 | 9/2014 | Scalisi et al. |
| 8,872,915 B1 | 10/2014 | Scalisi et al. |
| 8,937,659 B1 | 1/2015 | Scalisi et al. |
| 8,953,040 B1 | 2/2015 | Scalisi et al. |
| 9,060,104 B2 | 6/2015 | Scalisi |

(Continued)

FOREIGN PATENT DOCUMENTS

| CN | 2660607 Y | 12/2004 |
|---|---|---|
| CN | 202110616 U | 1/2012 |

(Continued)

*Primary Examiner* — Tai T Nguyen
(74) *Attorney, Agent, or Firm* — McClure, Qualey & Rodack, LLP

(57) ABSTRACT

A doorbell system and a doorbell control device are provided. The doorbell system includes a doorbell control device, a transformer, a doorbell interface device, and a chime device. The doorbell control device has a first pin, a second pin, a third pin, and a fourth pin. The doorbell control device is configured to control a conducting state between the first pin and the third pin according to a current or a voltage of the second pin. The first pin is coupled to the second pin. The transformer outputs an AC voltage to the first pin and the fourth pin of the doorbell control device. The doorbell interface device is coupled to the second pin and the fourth pin of the doorbell control device. The chime device is coupled to the third pin and the fourth pin of the doorbell control device.

10 Claims, 7 Drawing Sheets

(56) References Cited

U.S. PATENT DOCUMENTS

| | | |
|---|---|---|
| 9,065,987 B2 | 6/2015 | Kasmir et al. |
| 9,160,987 B1 | 10/2015 | Kasmir et al. |
| 9,172,920 B1 | 10/2015 | Kasmir et al. |
| 9,179,108 B1 | 11/2015 | Scalisi et al. |
| 9,282,665 B1 * | 3/2016 | Ladanyi ............. H05B 33/0809 |
| 2005/0040954 A1 | 2/2005 | McNally |
| 2010/0245060 A1 | 9/2010 | Tylicki et al. |
| 2015/0029009 A1 | 1/2015 | Scalisi et al. |
| 2015/0049191 A1 | 2/2015 | Scalisi et al. |
| 2015/0109113 A1 | 4/2015 | Scalisi et al. |
| 2015/0161856 A1 | 6/2015 | Wilson et al. |
| 2015/0163463 A1 | 6/2015 | Hwang et al. |

FOREIGN PATENT DOCUMENTS

| | | |
|---|---|---|
| WO | 9508891 A1 | 3/1995 |
| WO | 2015013275 A1 | 1/2015 |
| WO | 2015031812 A1 | 3/2015 |

\* cited by examiner

DOORBELL SYSTEM AND DOORBELL CONTROL DEVICE

This application claims the benefits of People's Republic of China application Serial No. 201620100706.X, filed Feb. 1, 2016, and People's Republic of China application Serial No. 201620117281.3, filed Feb. 5, 2016, the subject matters of which are incorporated herein by reference.

BACKGROUND

Field of the Invention

The disclosure relates in general to a doorbell system and a doorbell control device, and more particularly to a doorbell control device that controls power supply of a doorbell system.

Related Art

A doorbell is a common device installed in many families. When a guest visits or when the inhabitant comes home, the doorbell may be pressed to produce sound to inform the person at home. Therefore it is an important issue regarding how to design a doorbell system to guarantee system reliability, and to consider the demand for cost reduction and ease of installation in the meantime.

SUMMARY

The disclosure relates to a doorbell system and a doorbell control device.

According to one aspect of the invention, a doorbell system is provided. The doorbell system includes a doorbell control device, a transformer, a doorbell interface device, and a chime device. The doorbell control device has a first pin, a second pin, a third pin, and a fourth pin. The doorbell control device is configured to control a conducting state between the first pin and the third pin according to a current or a voltage of the second pin. The first pin is coupled to the second pin. The transformer outputs an AC voltage to the first pin and the fourth pin of the doorbell control device. The doorbell interface device is coupled to the second pin and the fourth pin of the doorbell control device. The chime device is coupled to the third pin and the fourth pin of the doorbell control device.

According to another aspect of the invention, a doorbell control device is provided. The doorbell control device has a first pin, a second pin, a third pin, and a fourth pin. The doorbell control device includes a voltage conversion circuit, a switch unit, and a control unit. The voltage conversion circuit is coupled to the first pin and the fourth pin, and is configured to generate a second DC voltage. The switch unit is configured to switch a conducting state between the first pin and the third pin. The control unit is powered by the second DC voltage, and is configured to control the switch unit according to a current or a voltage of the second pin. The first pin is coupled to the second pin.

The invention will become apparent from the following detailed description of the preferred but non-limiting embodiments. The following description is made with reference to the accompanying drawings.

Figure 1:
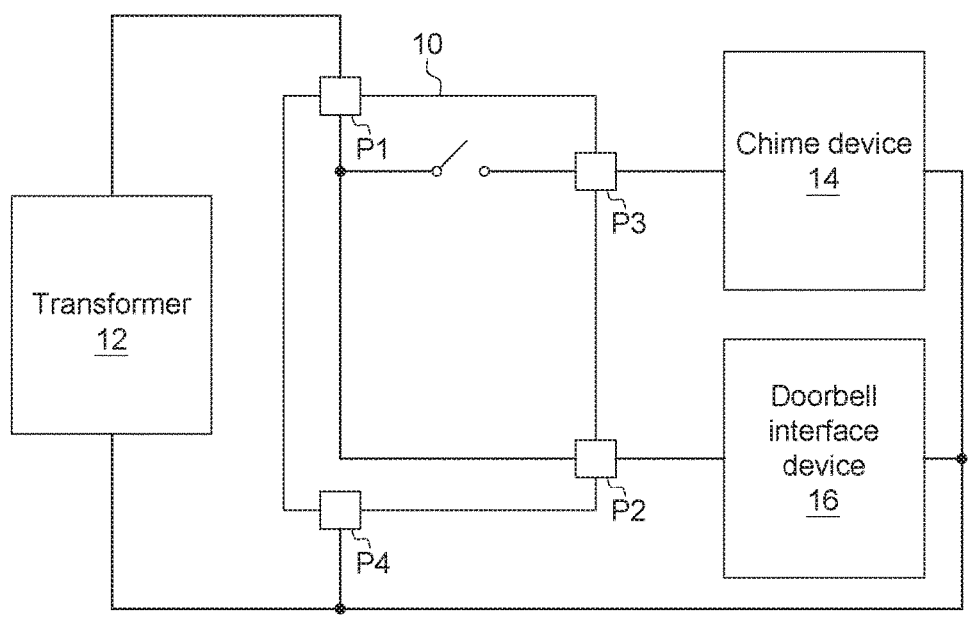
FIG. 1 shows a diagram illustrating a doorbell system according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A doorbell system driven by electrical signals may include a is doorbell interface device (including a button for example) disposed outside a door, a chime device disposed indoors, and a transformer for power supply. In a standby mode (in the following description, the standby mode represents a state that the doorbell button is not pressed), the chime device does not produce sound. When a visitor presses the button of the doorbell interface device, the chime device produces sound.

The chime device may be a digital chime device or an analog chime device, such as a solenoid, a metal wire wrapping around a core. Take the analog chime device as an example, when the doorbell button is not pressed, the current is mainly supplied to the control circuit of the doorbell interface device. The doorbell interface device operates in a normal state, and the solenoid remains in a stable position. When the doorbell button is pressed, the current flows through a power switching circuit and the wrapping wire to form a loop, such that a large current flows through the metal coil. The solenoid moves as a result of the induced magnetic field, and the solenoid may hit an object to produce sound. In this exemplary chime device, because there is always current flowing through the chime device in the doorbell system, when the current flowing through the chime device is too large, there may be an excitation problem, which causes the chime device to buzz in the standby mode. As for a digital chime device, because there is always current flowing through the chime device in the doorbell system, when the current flowing through the chime device is too large, there may be an error causing the digital chime to produce sound unexpectedly.

Further, when the doorbell button is pressed, the power supplied to the interior of the doorbell interface device is switched to be supplied to the chime device indoors. The doorbell interface device loses power temporarily. Therefore it is common to install a battery in the doorbell interface device. However, the battery occupies space, and the battery may eventually run out of power. Even if a rechargeable battery is used, an additional charging circuit is required in the doorbell interface device. Also, the battery needs an additional boost circuit to increase the voltage generated by the battery in order to drive other circuits in the doorbell interface device. These additional circuits as mentioned above and the battery itself occupy much interior space of the doorbell interface device, which is unfavorable for cost reduction.

FIG. 1 shows a diagram illustrating a doorbell system 1 according to one embodiment of the invention. The doorbell system 1 includes a doorbell control device 10, a transformer 12, a doorbell interface device 16, and a chime device 14. The doorbell control device 10 has a first pin P1, a second pin P2, a third pin P3, and a fourth pin P4. The doorbell control device 10 is configured to control a conducting state between the first pin P1 and the third pin P3 according to a current or a voltage of the second pin P2. The first pin P1 is coupled to the second pin P2. The transformer 12 outputs an alternating current (AC) voltage to the first pin P1 and the fourth pin P4 of the doorbell control device 10. The doorbell interface device 16 is coupled to the second pin P2 and the fourth pin P4 of the doorbell control device 10. The chime device 14 is coupled to the third pin P3 and the fourth pin P4 of the doorbell control device 10.

The transformer 12 may convert the AC power from the mains (for example, 110V or 220V) to an AC voltage $V_{POWER}$ with smaller amplitude (for example, with amplitude range 8V-32V). The transformer 12 may output the AC voltage $V_{POWER}$ to the first pin P1 and the fourth pin P4 of the doorbell control device 10 to supply power to the doorbell control device 10. The doorbell interface device 16 may also be powered by the AC voltage $V_{POWER}$. For example, the doorbell interface device 16 may include a button, an intercom, and an IP camera. The IP camera may serve for surveillance purpose. In the standby mode, the IP camera may record films of the environment surrounding the house. When a visitor approaches the doorbell button, the IP camera may focus on the visitor, and transmit video data through network, such that the user may see the video recording the visitor via a network device (such as a smartphone). The doorbell interface device 16 may be continuously powered by the AC voltage $V_{POWER}$ outputted from the transformer 12. Hence the doorbell interface device 16 can maintain operation for a long period of time without a need to put a battery inside. Consequently the IP camera can keep recording uninterruptedly, and can provide live streaming to the user in real time through network transmission.

When the button of the doorbell interface device 16 is pressed, the doorbell interface device 16 sends a signal to inform the doorbell control device 10, such as changing a current or a voltage of the second pin P2 of the doorbell control device 10, such that the doorbell control device 10 controls the chime device 14 to produce sound. In one embodiment, when the button of the doorbell interface device 16 is pressed, there will be a current change in the internal circuit of the doorbell interface device 16 to inform the doorbell control device 10. For example, the doorbell interface device 16 may have large current flowing through to indicate the button pressing. When the button is pressed, a nearly short-circuited state may be created for about 0.2 ms, such that the current flowing through the second pin P2 may increase instantaneously, and the voltage at the second pin P2 drops instantaneously, and thus the doorbell control device 10 recognizes that the doorbell button is pressed.

The doorbell control device 10 may control the conducting state between the first pin P1 and the third pin P3 according to the current or the voltage of the second pin P2. In the standby mode, the doorbell control device 10 controls the conducting state between the first pin P1 and the third pin P3 to be off, and hence the AC voltage $V_{POWER}$ outputted from the transformer 12 is not supplied to the chime device 14, and the chime device 14 does not produce sound. The chime device 14 has internal resistance, which may be 10 ohm for example. When the doorbell button is pressed, the doorbell control device 10 receives such message (doorbell being pressed) according to the current or the voltage of the second pin P2, and then controls the conducting state between the first pin P1 and the third pin P3 to be on, such as being on from 0.2 ms to several seconds. A large current will flow through the chime device 14 (with internal resistance 10 ohm) to make the chime device 14 produce sound. Note that the doorbell interface device 16 is still being powered in this situation. Moreover, because in the standby mode the path between the first pin P1 and the third pin P3 is not conducting, current is prevented from flowing into the chime device 14. Therefore when the doorbell is not pressed, the chime device 14 does not buzz, which may be caused by excitation phenomena.

The chime device 14 in the above embodiment uses an analog device, such as including a solenoid and metallic coil, and producing sound by hitting metal. However, the architecture shown in the doorbell system 1 may also use a digital circuit to constitute the chime device 14. A digital chime device may include a microprocessor, which may control a music integrated circuit to produce sound. In addition, because the doorbell interface device 16 is powered by the voltage outputted from the transformer 12 continuously, the doorbell interface device 16 does not need a battery. The production cost can thus be reduced, and the system reliability can be enhanced. Furthermore, for the doorbell interface device 16 that has an IP camera, a long time high quality video live streaming can be accomplished.

The block diagram shown in FIG. 1 is a simplified schematic, rather than the actual circuit level implementation. FIG. 1 illustrates the internal switch control in the doorbell control device 10. The circuit implementation of the doorbell control device 10 is not limited thereto. Instead, other circuit units may also be included in the doorbell control device 10.

Figure 2A:
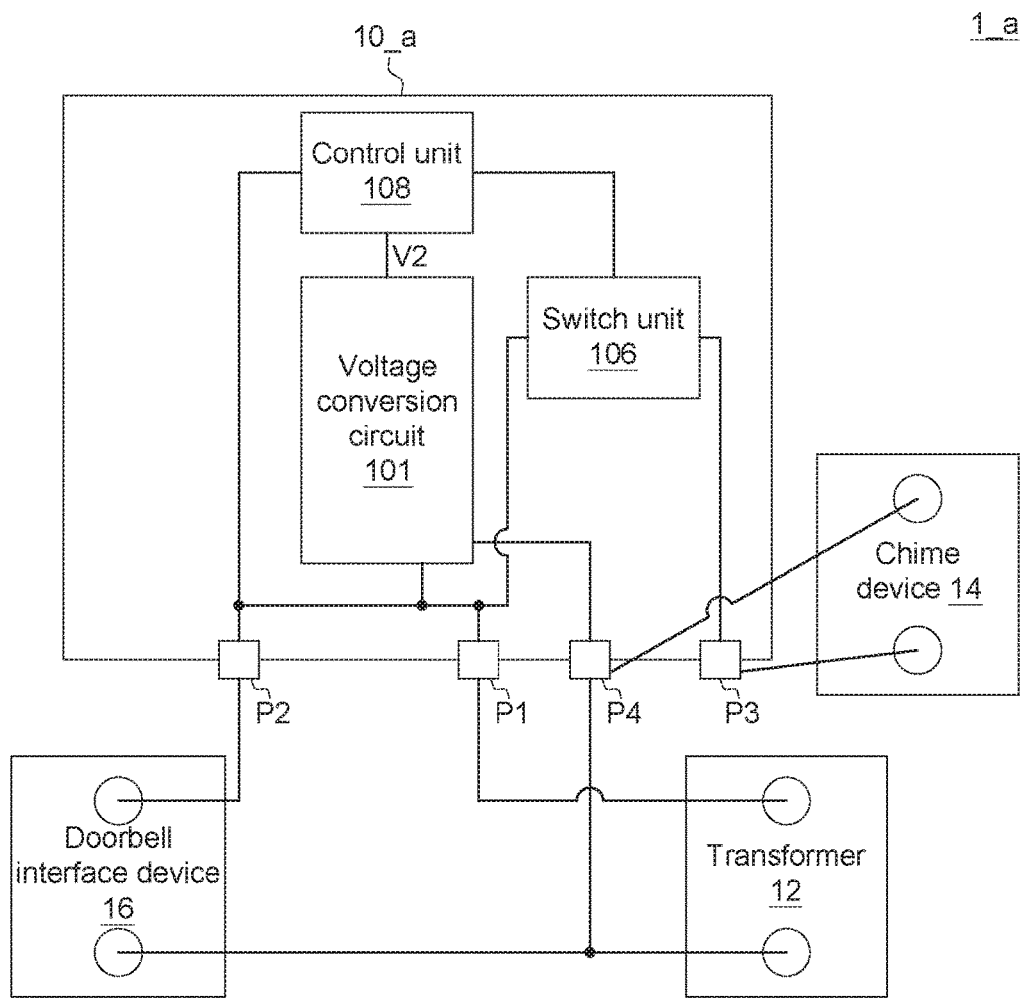
FIG. 2A shows a diagram illustrating a doorbell system according to one embodiment of the invention.

FIG. 2A shows a diagram illustrating a doorbell system 1_a according to one embodiment of the invention. The doorbell system 1_a includes a doorbell control device 10_a, a transformer 12, a chime device 14, and a doorbell interface device 16. The connection relationship between these units is similar to that in the doorbell system 1 shown in FIG. 1, and thus is not repeated here. The doorbell control device 10_a includes a voltage conversion circuit 101, a switch unit 106, and a control unit 108. The voltage conversion circuit 101 is coupled to the first pin P1 and the fourth pin P4, and is configured to generate a second direct current (DC) voltage V2. For example, the voltage conversion circuit 101 may convert the AC voltage $V_{POWER}$ to the second DC voltage V2. The switch unit 106 is configured to switch the conducting state between the first pin P1 and the third pin P3. The control unit 108 is powered by the second DC voltage V2, and is configured to control the switch unit 106 according to the current or the voltage of the second pin P2.

Figure 2B:
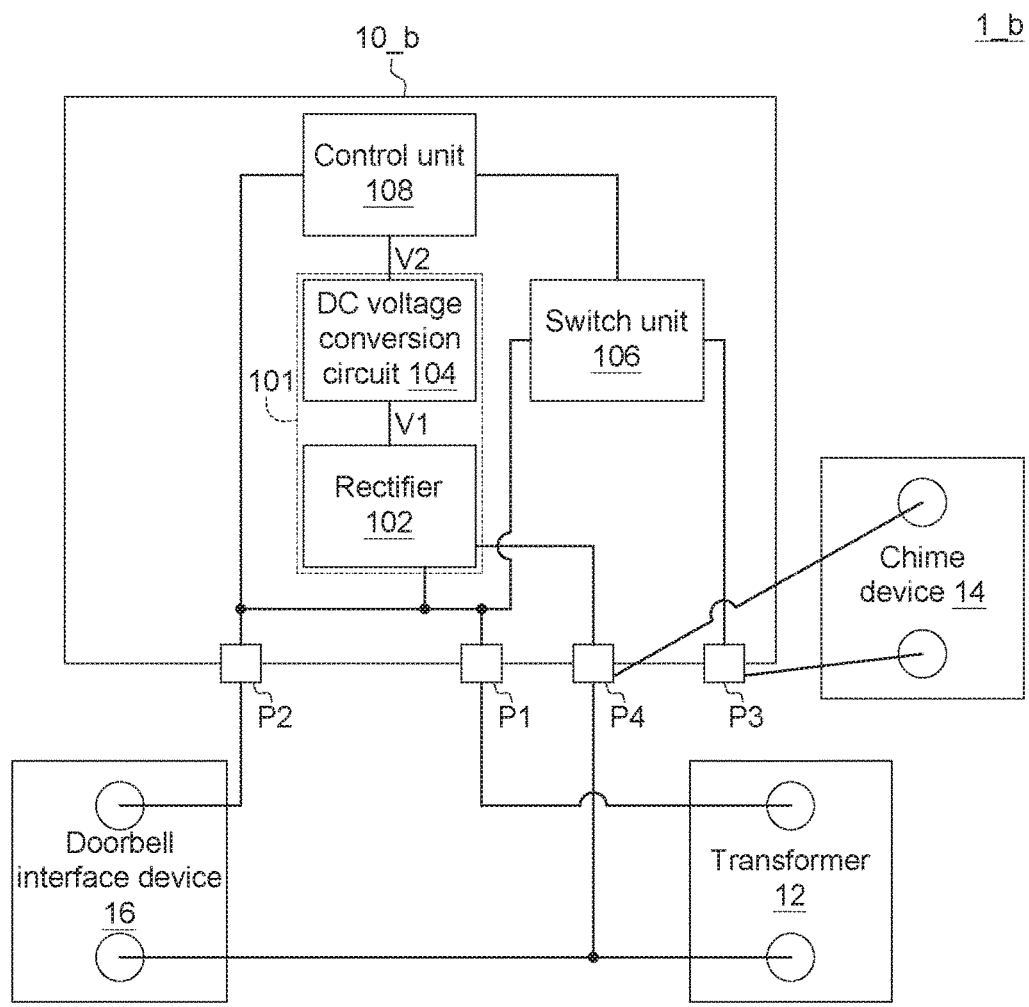
FIG. 2B shows a diagram illustrating a doorbell system according to one embodiment of the invention.

FIG. 2B shows a diagram illustrating a doorbell system according to one embodiment of the invention. The doorbell system 1_b includes a doorbell control device 10_b, a transformer 12, a chime device 14, and a doorbell interface device 16. In this embodiment, the voltage conversion circuit 101 includes a rectifier 102 and a DC voltage conversion circuit 104. The rectifier 102 is coupled to the first pin P1 and the fourth pin P4, and is configured to convert a voltage between the first pin P1 and the fourth pin P4 to a first DC voltage V1. The rectifier 102 may convert the AC voltage $V_{POWER}$ to the first DC voltage V1. The first DC voltage V1 is DC 18V. One exemplary implementation of the rectifier 102 may be a bridge rectifier composed of diodes. The DC voltage conversion circuit 104 is configured to convert the first DC voltage V1 to the second DC voltage V2. The DC voltage conversion circuit 104 may be a buck converter that down converts the first DC voltage V1 to the second DC voltage V2. The second DC voltage V2 may be 5V or 3.3V, supplying power to the control unit 108. The rectifier 102 and the DC voltage conversion circuit 104 may be integrated in a single circuit. The control unit 108 may be a microprocessor, and may output a control signal to the switch unit 106 through a general purpose input output pin (GPIO) according to the current or the voltage of the second pin P2. The control unit 108 may also be implemented by a digital logic circuit. The switch unit 106 may be a photo-coupler relay, configured to switch the conducting state between the first pin P1 and the third pin P3, and to control when the chime device 14 produces sound. The doorbell control device 10_b shown in FIG. 2B is one possible implementation of the doorbell control device 10 shown in FIG. 1. The operating principle may be referred to the embodiment shown in FIG. 1.

Figure 3:
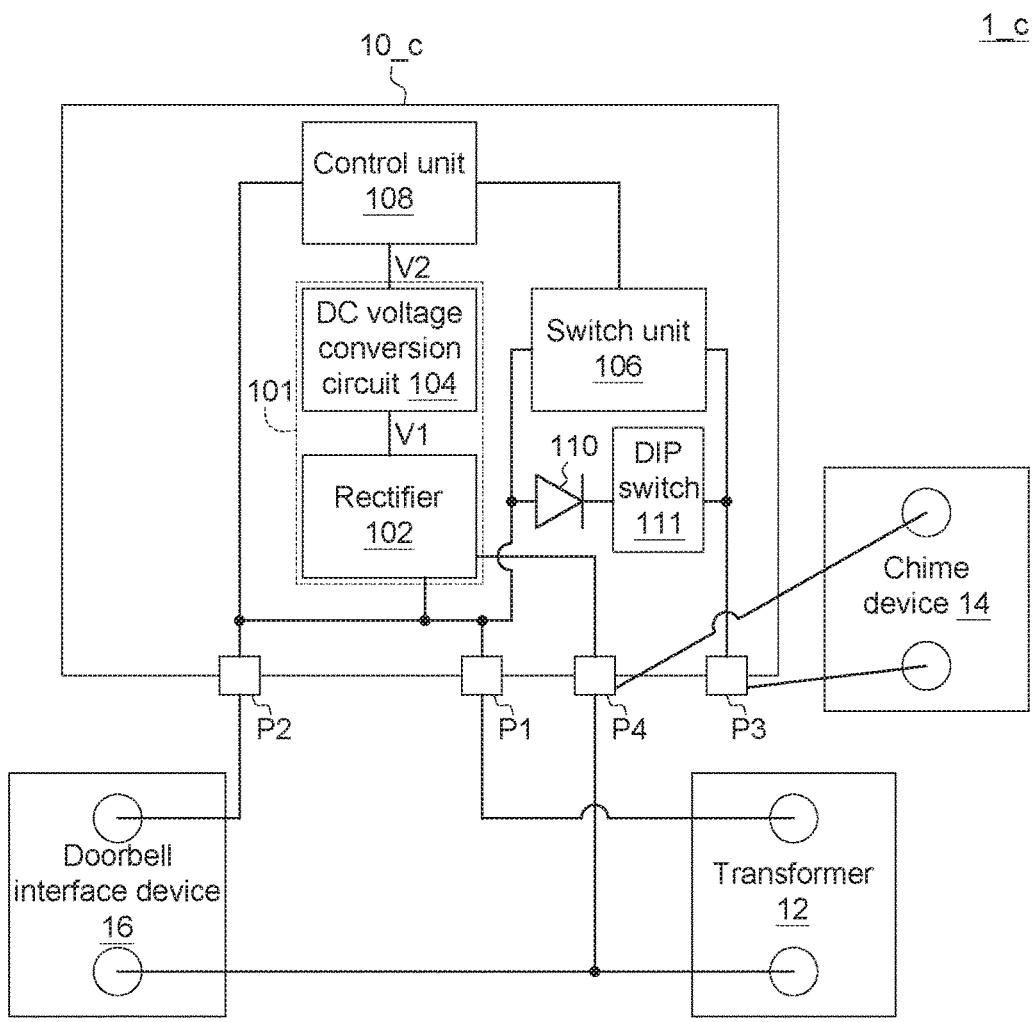
FIG. 3 shows a diagram illustrating a doorbell system according to one embodiment of the invention.

FIG. 3 shows a diagram illustrating a doorbell system 1_c according to one embodiment of the invention. The doorbell system 1_c includes a doorbell control device 10_c, which differs from the doorbell control device 10_b in FIG. 2B in that the doorbell control device 10_c further includes a diode 110. The diode 110 is coupled between the first pin P1 and the third pin P3 to form a current conducting path. When the control unit 108 controls the conducting state between the first pin P1 and the third pin P3 to be off through the switch unit 106, because of the diode 110 between the first pin P1 and the third pin P3, there still exists a small current $I_S$ passing through the first pin P1 and the third pin P3 when the doorbell button is not pressed. The small current $I_S$ flows through the chime device 14, such that the internal circuit of the chime device 14 keeps in a standby state. Consequently when the doorbell button is pressed, the chime device 14 can react quickly to produce sound.

The diode 110 is disposed in the doorbell control device 10_c. This approach may be suitable for a digital chime device, and may not be adapted to an analog chime device. In one embodiment, the doorbell control device 10_c further includes a dual-in-line package (DIP) switch 111. A user may operate the DIP switch 111 to switch between a digital chime device and an analog chime device. The digital chime device is used as an example here. If there is no current flowing through the internal circuit of the digital chime device 14 in the standby mode (completely power-off), when a visitor presses the doorbell button, the circuit needs a certain reaction time to make transition from the initial power-off state to the sound producing state. The reaction time may be the charging time of an internal capacitor, or the boot-up time of the internal circuit of the digital chime device. By setting the diode 110, there is a small current flowing through the chime device 14 even in the state that the chime device is not producing sound. For example, the internal circuit may remain activated, or the internal capacitor may store a certain amount of charge, such that the chime device 14 can quickly make transition to the sound producing state.

Figure 4:
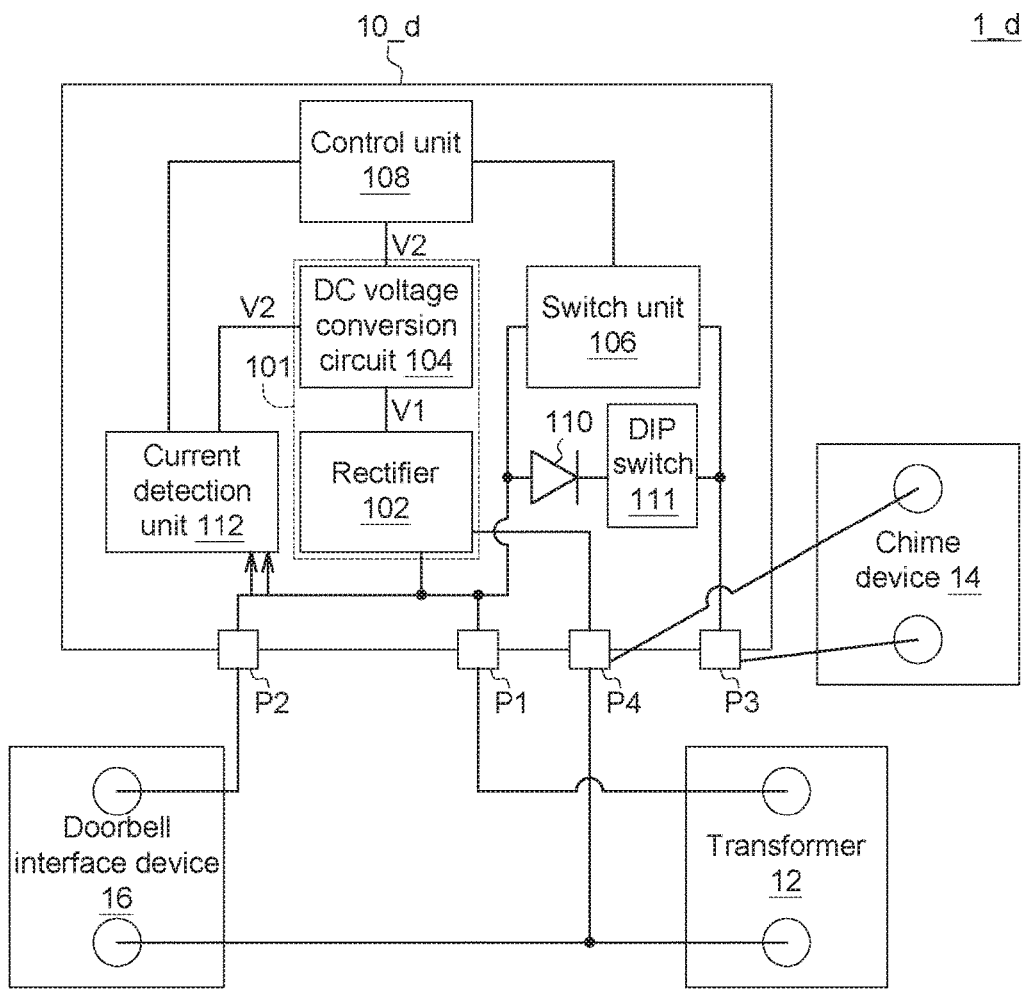
FIG. 4 shows a diagram illustrating a doorbell system according to one embodiment of the invention.

The control unit 108 may be directly coupled to the second pin P2 to directly detect the current or the voltage of the second pin P2, and then control the switch unit 106 accordingly. A different embodiment regarding current or voltage detection is given below. FIG. 4 shows a diagram illustrating a doorbell system 1_d according to one embodiment of the invention. The doorbell system 1_d includes a doorbell control device 10_d. The diode 110 and the DIP switch 111 in the doorbell control device 10_d may be optionally disposed. The doorbell control device 10_d includes a current detection unit 112. The current detection unit 112 may be powered by the second DC voltage V2. The current detection unit 112 may be configured to detect an operating current $I_{OP}$ flowing from the first pin P1 to the second pin P2. Because the transformer 12 outputs an AC voltage $V_{POWER}$, the actual direction of the operating current $I_{OP}$ may be either from the first pin P1 to the second pin P2 or from the second pin P2 to the first pin P1. In one embodiment, the current detection unit 112 may detect the magnitude of the operating current $I_{OP}$. When the operating current $I_{OP}$ detected by the current detection unit 112 meets a current criterion $C_I$, the control unit 108 is configured to control the switch unit 106 on. On the other hand, when the operating current $I_{OP}$ detected by the current detection unit 112 does not meet the current criterion $C_I$, the control unit 108 is configured to control the switch unit 106 off.

Figure 5:
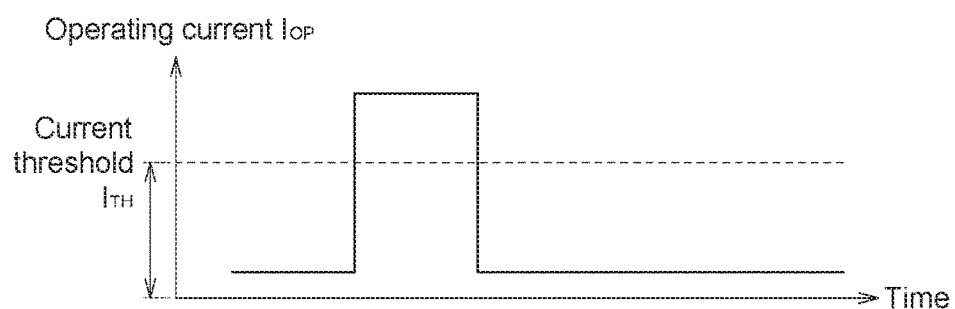
FIG. 5 shows a diagram illustrating detection of the operating current according to one embodiment of the invention.

The current criterion $C_I$ noted above may be related to whether or not the button of the doorbell interface device 16 is pressed. When the button is pressed, the doorbell interface device 16 may change the current flowing through the second pin P2, such that the operation current $I_{OP}$ meets the circuit criterion $C_I$, making the switch unit 106 on. There may be several implementations for the circuit criterion $C_I$. For example, when the doorbell button is pressed, the doorbell interface device 16 may increase the current flowing through the second pin P2 by creating a nearly short-circuited state momentarily. In this example, the circuit criterion $C_I$ is that the operating current $I_{OP}$ is greater than a current threshold H. FIG. 5 shows a diagram illustrating detection of the operating current $I_{OP}$ according to one embodiment of the invention. FIG. 5 shows the waveform of the operating current $I_{OP}$ versus time. The waveform shows the magnitude (absolute value) of the operating current $I_{OP}$. When the operating current $I_{OP}$ is less than the current threshold $I_{TH}$, the chime device 14 is in the standby mode. When the operating current $I_{OP}$ is greater than the current threshold $I_{TH}$, the control unit 108 is configured to control the switch unit 106 on, such that the chime device 14 produces sound.

Figure 6:
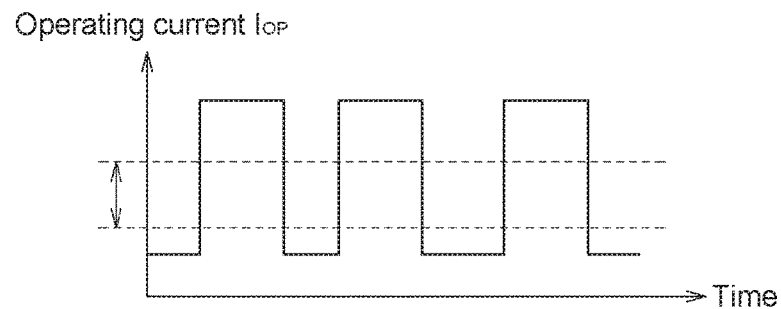
FIG. 6 shows a diagram illustrating detection of the operating current according to one embodiment of the invention.

In another embodiment, when the doorbell button is pressed, the doorbell interface device 16 may produce a current with a characteristic waveform, such as a current waveform having three consecutive pulses. In this example, the current criterion $C_I$ is that the number of pulses of the operating current $I_{OP}$ in a time period meets a current pulse number criterion. The current detection unit 112 may detect the number of pulses of the operating current $I_{OP}$ in one time period. If the number of pulses meets the current pulse number criterion, the current detection unit 112 may inform the control unit 108 to turn on the switch unit 106. FIG. 6 shows a diagram illustrating detection of the operating current according to one embodiment of the invention. The range specified by the two dashed lines represents a current upper bound and a current lower bound set by the current detection unit 112. When the current detection unit 112 detects that the operating current $I_{OP}$ exceeds the range specified by the dashed lines, a pulse is detected. The current detection unit 112 may calculate the number of pulses produced by the operating current $I_{OP}$ within one time period to determine whether or not to turn on the switch unit 106.

Figure 7:
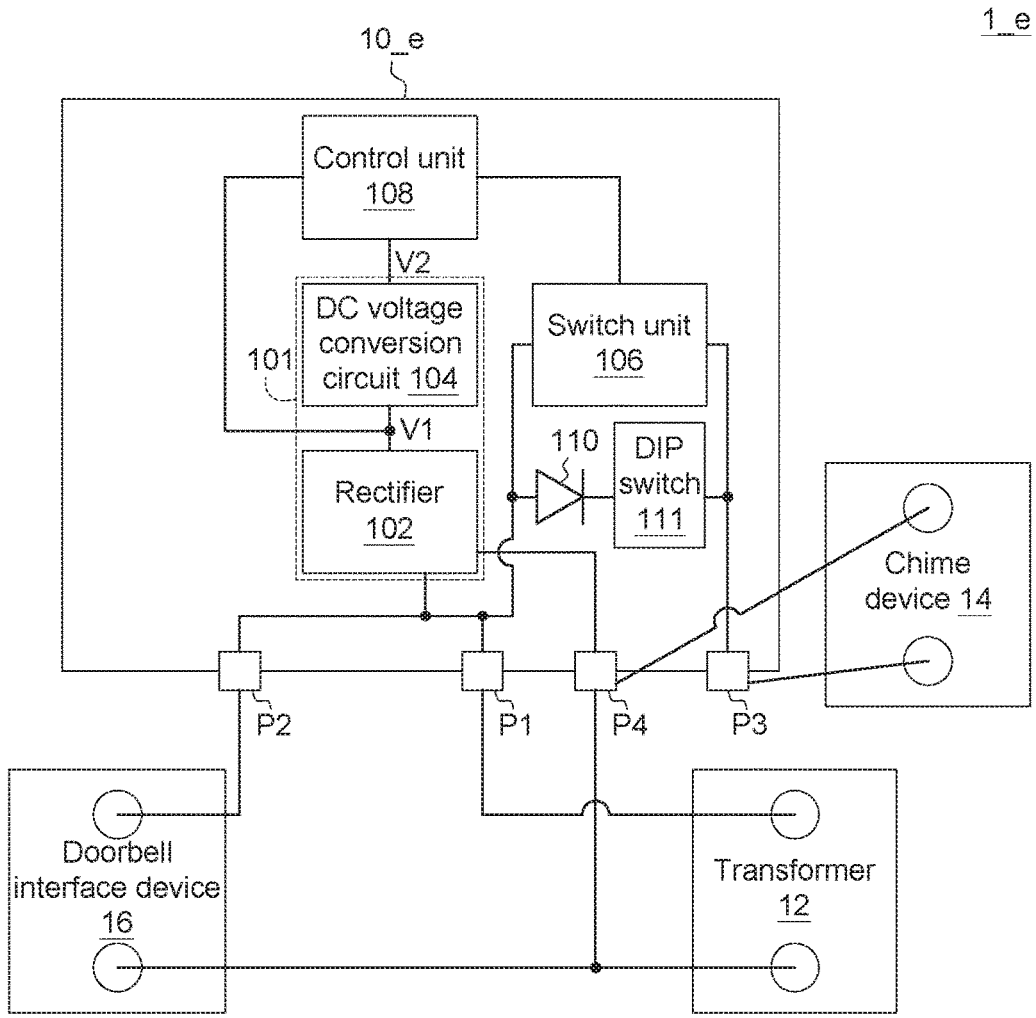
FIG. 7 shows a diagram illustrating a doorbell system according to one embodiment of the invention.

In addition to current detection, the control unit 108 may also detect the voltage at the second pin P2 to determine the conducting state of the switch unit 106. Because the rectifier 102 converts the AC voltage $V_{POWER}$ to the first DC voltage V1, the first DC voltage D1 outputted from the rectifier 102 is related to the voltage at the second pin P2. Thus the control unit 108 may also detect the first DC voltage V1 outputted from the rectifier 102. FIG. 7 shows a diagram illustrating a doorbell system 1_e according to one embodiment of the invention. The doorbell system 1_e includes a doorbell control device 10_e. The diode 110 and the DIP switch 111 in the doorbell control device 10_e may be optionally disposed. The control unit 108 in the doorbell control device 10_e may detect the first DC voltage V1 outputted from the rectifier 102. When the first DC voltage V1 meets a voltage criterion $C_V$, the control unit 108 is configured to control the switch unit 106 on. On the other hand, when the first DC voltage V1 does not meet the voltage criterion $C_V$, the control unit 108 is configured to control the switch unit 106 off.

Figure 8:
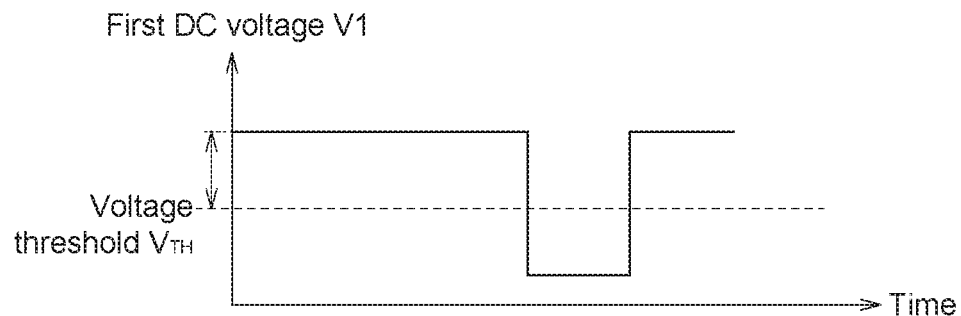
FIG. 8 shows a diagram illustrating detection of the first DC voltage according to one embodiment of the invention.

For example, when the doorbell button is pressed, the doorbell interface device 16 may increase the current flowing through the second pin P2 by creating a nearly short-circuited state momentarily, such that the voltage at the second pin P2 drops instantaneously. In this case the first DC voltage V1 outputted from the rectifier 102 drops correspondingly, such as dropping to 8V. In this example, the voltage criterion $C_V$ is that the first DC voltage V1 is less than a voltage threshold $V_{TH}$. FIG. 8 shows a diagram illustrating detection of the first DC voltage according to one embodiment of the invention. FIG. 8 shows the waveform of the first DC voltage V1 versus time. When the first DC voltage V1 is greater than the voltage threshold $V_{TH}$, the chime device 14 is in the standby mode. When the first DC voltage V1 is less than the voltage threshold $V_{TH}$, the control unit 108 is configured to control the switch unit 106 on, such that the chime device 14 produces sound.

Figure 9:
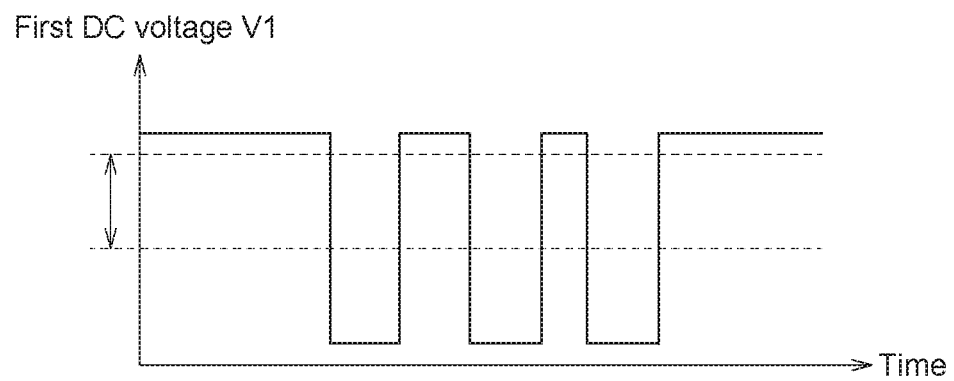
FIG. 9 shows a diagram illustrating detection of the first DC voltage according to one embodiment of the invention.

In another embodiment, when the doorbell button is pressed, the doorbell interface device 16 may produce a voltage with a characteristic waveform, such that the rectifier 102 outputs a voltage waveform having three consecutive pulses for example. In this example, the voltage criterion $C_V$ is that the number of pulses of the first DC voltage V1 in a time period meets a voltage pulse number criterion. The control unit 108 may detect the number of pulses of the first DC voltage V1 in one time period. If the number of pulses meets the voltage pulse number criterion, such as being greater than or equal to three pulses, the switch unit 106 is turned on. FIG. 9 shows a diagram illustrating detection of the first DC voltage according to one embodiment of the invention. The range specified by the two dashed lines represents a voltage upper bound and a voltage lower bound set by the control unit 108. When the control unit 108 detects that the first DC voltage V1 exceeds the range specified by the dashed lines, a pulse is detected. The control unit 108 may calculate the number of pulses produced by the first DC voltage V1 within one time period to determine whether or not to turn on the switch unit 106.

According to the doorbell system in the above embodiments, because the doorbell control device controls the power supplied to the chime device and the doorbell interface device, the doorbell interface device can be powered continuously. There is no need for using a battery in the doorbell interface device, and a long time uninterrupted video recording, video encoding, and network data transmission can be accomplished. Also the boost circuit and/or charging circuit that work with the battery are not required, and hence the circuit area as well as the production cost can be reduced. From a user's perspective, more convenience is brought to the user because there is no need to change batteries, and a long time video recording provides a better protection for the home security.

The doorbell control device can control the operation of the switch unit to determine whether power is supplied to the chime device by detecting the change in current or voltage from the current interface device. The buzz sound of an analog chime device when the doorbell button is not pressed can be prevented. In addition, for a digital chime device, a current conducting path can be established such that a small current still flows through the digital chime device even when the chime device does not produce sound. Therefore the digital chime device can maintain in a standby mode and can quickly switch to a state that produces sound. Further, a possible error caused by a large current flowing through the digital chime device can also be prevented. The doorbell control device disclosed in the above embodiments has a wide range of applications and can be adapted to an analog chime device as well as a digital chime device. Moreover, the doorbell system disclosed in the above embodiments can be directly connected to the AC power, and thus the user does not have to modify the original indoor wiring design. The doorbell system in this disclosure has an advantage of being easy to install.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A doorbell system, comprising:
a doorbell control device, having a first pin, a second pin, a third pin, and a fourth pin, wherein the doorbell control device is configured to control a conducting state between the first pin and the third pin according to a current or a voltage of the second pin, and the first pin is coupled to the second pin;
a transformer, outputting an AC voltage to the first pin and the fourth pin of the doorbell control device;
a doorbell interface device, coupled to the second pin and the fourth pin of the doorbell control device; and
a chime device, coupled to the third pin and the fourth pin of the doorbell control device;
wherein the doorbell control device comprises:
a voltage conversion circuit, coupled to the first pin and the fourth pin, configured to generate a second DC voltage;
a switch unit, configured to switch the conducting state between the first pin and the third pin; and
a control unit, powered by the second DC voltage, configured to control the switch unit according to the current or the voltage of the second pin.

2. The doorbell system according to claim 1, wherein the voltage conversion circuit comprises:
a rectifier, configured to convert a voltage between the first pin and the fourth pin to a first DC voltage; and
a DC voltage conversion circuit, configured to convert the first DC voltage to the second DC voltage.

3. The doorbell system according to claim 2, wherein the doorbell control device further comprises:

a diode, coupled between the first pin and the third pin; and a current detection unit, powered by the second DC voltage, coupled to the control unit, configured to detect an operating current flowing from the first pin to the second pin;

wherein the control unit is configured to control the switch unit on when the operating current detected by the current detection circuit meets a current criterion, and to control the switch unit off when the operating current does not meet the current criterion.

4. The doorbell system according to claim 2, wherein the control unit is coupled to the rectifier, the control unit is configured to receive the first DC voltage generated by the rectifier, the control unit is configured to control the switch unit on when the control unit determines that the first DC voltage meets a voltage criterion, and the control unit is configured to control the switch unit off when the control unit determines that the first DC voltage does not meet the voltage criterion.

5. The doorbell system according to claim 1, wherein the doorbell interface device comprises a button, the doorbell interface device is configured to change the current or the voltage of the second pin of the doorbell control device and the doorbell control device is configured to control the conducting state between the first pin and the third pin to be on when the button is pressed, and the doorbell control device is configured to control the conducting state between the first pin and the third pin to be off when the button is not pressed.

6. The doorbell system according to claim 5, wherein the chime device produces sound when the conducting state between the first pin and the third pin is on, and the chime device does not produce sound when the conducting state between the first pin and the third pin is off.

7. A doorbell control device, having a first pin, a second pin, a third pin, and a fourth pin, the doorbell control device comprising:

a voltage conversion circuit, coupled to the first pin and the fourth pin, configured to generate a second DC voltage;

a switch unit, configured to switch a conducting state between the first pin and the third pin; and a control unit, powered by the second DC voltage, configured to control the switch unit according to a current or a voltage of the second pin;

wherein the first pin is coupled to the second pin.

8. The doorbell control device according to claim 7, wherein the voltage conversion circuit comprises:

a rectifier, configured to convert a voltage between the first pin and the fourth pin to a first DC voltage; and a DC voltage conversion circuit, configured to convert the first DC voltage to the second DC voltage.

9. The doorbell control device according to claim 8, wherein the doorbell control device further comprises:

a diode, coupled between the first pin and the third pin; and a current detection unit, powered by the second DC voltage, coupled to the control unit, configured to detect an operating current flowing from the first pin to the second pin;

wherein the control unit is configured to control the switch unit on when the operating current detected by the current detection circuit meets a current criterion, and the control unit is configured to control the switch unit off when the operating current does not meet the current criterion.

10. The doorbell control device according to claim 8, wherein the control unit is coupled to the rectifier, the control unit is configured to receive the first DC voltage generated by the rectifier, the control unit is configured to control the switch unit on when the control unit determines that the first DC voltage meets a voltage criterion, and the control unit is configured to control the switch unit off when the control unit determines that the first DC voltage does not meet the voltage criterion.

* * * * *